(12) United States Patent
Stumpf et al.

(10) Patent No.: US 12,004,685 B2
(45) Date of Patent: Jun. 11, 2024

(54) FOOD HEATING APPARATUS (71) Applicants: William R. Stumpf, Essex, MD (US); Wendy Stumpf, Essex, MD (US)

(72) Inventors: William R. Stumpf, Essex, MD (US); Wendy Stumpf, Essex, MD (US)

( * ) Notice: Subject to any disclaimer, the term of this patent is extended or adjusted under 35 U.S.C. 154(b) by 754 days.

(21) Appl. No.: 17/184,981

(22) Filed: Feb. 25, 2021

(65) Prior Publication Data
US 2022/0265088 A1 Aug. 25, 2022

(51) Int. Cl.
*A47J 36/24* (2006.01)
*B65G 15/34* (2006.01)
*B65G 23/04* (2006.01)
*B65G 23/44* (2006.01)
*H05B 1/02* (2006.01)
*H05B 3/26* (2006.01)

(52) U.S. Cl.
CPC .......... *A47J 36/2483* (2013.01); *B65G 15/34* (2013.01); *B65G 23/04* (2013.01); *B65G 23/44* (2013.01); *H05B 1/0263* (2013.01); *H05B 3/26* (2013.01); *B65G 2203/0291* (2013.01)

(58) Field of Classification Search
CPC ..... A47J 36/2483; B65G 15/34; B65G 23/04; B65G 23/44; B65G 2203/0291; H05B 1/0263; H05B 3/26
See application file for complete search history.

(56) References Cited

U.S. PATENT DOCUMENTS

| 6,817,283 | B2 * | 11/2004 | Jones ................ A47J 37/0857 99/443 C |
| 9,161,547 | B2 * | 10/2015 | McKee ................ A21B 1/245 |
| 10,912,306 | B2 * | 2/2021 | De Luca ................ H05B 3/34 |
| 11,639,797 | B2 * | 5/2023 | McKee ................ A21B 2/00 219/400 |
| 2008/0067166 | A1 * | 3/2008 | Yoder ................ A21B 1/48 219/400 |
| 2011/0283894 | A1 * | 11/2011 | Schjerven, Sr. ....... A21B 1/245 99/443 C |
| 2015/0344229 | A1 * | 12/2015 | Johanson ............... B65H 5/224 198/689.1 |
| 2021/0138800 | A1 * | 5/2021 | Terradellas Callau ....... B41J 11/007 |
| 2022/0221157 | A1 * | 7/2022 | Huijsing ................ F24C 15/16 |

OTHER PUBLICATIONS

Star 210HX Electric Heater Conveyor Oven, https://www.amazon.com/Star-210HX-Electric-Heater-Conveyor/dp/B00HDEWX38.
Countertop Impinger Conveyor Oven, https://www.katom.com/589-HHC2020VNTLSS.html.

* cited by examiner

*Primary Examiner* — Omar Flores Sanchez (57) ABSTRACT

A food heating apparatus includes a housing, a conveyor assembly, a first heating element, a second heating element, a control unit, and a power source. The housing comprises a base portion and a top portion. The base portion forms a first interior space in which the conveyor assembly is located. The top portion forms a second interior space in which the second heating element is located. The top portion further forms a tunnel. The tunnel comprises an entrance and an exit. The conveyor assembly comprises a belt, a motor, a driving pulley, and a driven pulley. The belt comprises an upper food-carrying run and a lower return run. The control unit comprises a control circuit that is configured to control a speed of the motor.

14 Claims, 10 Drawing Sheets

FOOD HEATING APPARATUS

FIELD OF THE INVENTION

The present invention relates generally to apparatuses for heating food products. More specifically, the present invention is an apparatus for evenly heating or reheating flat baked or cooked food. The present invention is specifically designed for heating or reheating cookies, biscuits, etc. However, the present invention is not limited to this option, and it may further be adapted for different purposes.

BACKGROUND OF THE INVENTION

A cookie is a baked or cooked food that is typically small, flat, and sweet. It usually contains flour, sugar, and some type of oil or fat. It may include ingredients such as raisins, oats, chocolate chips, nuts, or any other ingredients that are desired by users. Cookies are popular worldwide because they are easy to bake, convenient to store, and have characteristic texture and taste.

Many people prefer warm cookies and choose to heat or reheat cookies in a microwave for a couple of seconds. However, like other microwaved food, cookies heated in the microwave usually have a deteriorated taste and thus are not comparable to freshly-baked ones.

Therefore, it is an objective of the present invention to provide a food heating apparatus that overcomes the problems set forth above.

SUMMARY OF THE INVENTION

In a first aspect of the present invention, a food heating apparatus comprises a housing, a conveyor assembly, a first heating element, a second heating element, a control unit, and a power source. The housing comprises a base portion and a top portion. The base portion forms a first interior space in which the conveyor assembly is located. The top portion forms a second interior space in which the second heating element is located. The top portion further forms a tunnel. The tunnel comprises an entrance and an exit. The conveyor assembly comprises a belt, a motor, a driving pulley, and a driven pulley. The belt comprises an upper food-carrying run and a lower return run. The driving pulley comprises a first cylindrical body and a driving pulley shaft. The driven pulley comprises a driven pulley shaft and a second cylindrical body that is substantially of the same diameter as the first cylindrical body. The motor is electrically connected to the power source and comprises an output shaft which is connected to the driving pulley shaft. The control unit comprises a control circuit that is configured to control a speed of the motor.

In a second aspect of the present invention, a food heating apparatus comprises a housing, a conveyor assembly, a first heating element, a second heating element, a control unit, and a power source. The housing comprises a base portion and a top portion. The base portion forms a first interior space in which the conveyor assembly is located. The top portion forms a second interior space in which the second heating element is located. The top portion further forms a tunnel. The tunnel comprises an entrance and an exit. The conveyor assembly comprises a belt, a motor, a driving pulley, a driven pulley, and a tensioning mechanism. The belt comprises an upper food-carrying run and a lower return run. The driving pulley comprises a first cylindrical body and a driving pulley shaft. The driven pulley comprises a driven pulley shaft and a second cylindrical body that is substantially of the same diameter as the first cylindrical body. The motor is electrically connected to the power source and comprises an output shaft which is connected to the driving pulley shaft. The tensioning mechanism comprises a first tensioning assembly and a second tensioning assembly. The first tensioning assembly and the second tensioning assembly are arranged on opposite ends of the driven pulley shaft, respectively. Each of the first tensioning assembly and the second tensioning assembly comprises a frame, a movable block, and a spring. Each frame comprises a groove with an expanded section and a reduced section. Each movable block moves linearly in respective expanded section and comprises a hole to receive an end of the driven pulley shaft. Each spring is, at one end, connected to respective movable block and, at an opposite end, engages an end wall of the reduced section. The control unit comprises a control circuit that is configured to control the speed of the motor.

In a third aspect of the present invention, a food heating apparatus comprises a housing, a conveyor assembly, a first heating element, a second heating element, a control unit, and a power source. The housing comprises a base portion and a top portion. The base portion forms a first interior space in which the conveyor assembly is located. The top portion forms a second interior space in which the second heating element is located. The top portion further forms a tunnel. The tunnel comprises an entrance and an exit. The conveyor assembly comprises a belt, a motor, a driving pulley, a driven pulley, and a tensioning mechanism. The belt comprises an upper food-carrying run and a lower return run. The driving pulley comprises a first cylindrical body and a driving pulley shaft. The driven pulley comprises a driven pulley shaft and a second cylindrical body that is substantially of the same diameter as the first cylindrical body. The motor is electrically connected to the power source and comprises an output shaft which is connected to the driving pulley shaft. The tensioning mechanism comprises a first tensioning assembly and a second tensioning assembly. The first tensioning assembly and the second tensioning assembly are arranged on opposite ends of the driven pulley shaft, respectively. Each of the first tensioning assembly and the second tensioning assembly comprises a frame, a movable block, and a spring. Each frame comprises a groove with an expanded section and a reduced section. Each movable block moves linearly in respective expanded section and comprises a hole to receive an end of the driven pulley shaft. Each spring is, at one end, connected to respective movable block and, at an opposite end, engages an end wall of the reduced section. The control unit comprises a control interface and a control circuit. The control interface comprises a heating control that is configured to receive a user's selection of a speed of the motor. The control circuit is configured to regulate the speed of the motor based on the user's selection.

One or more of the following features may be included. The belt may comprise a fiberglass polytetrafluoroethylene ("PTFE") coated belt. The frame may be integrally formed with the housing. Each of the first heating element and the second heating element may comprise a thermal insulation plate forming a top surface and a bottom surface and a heating coil. The heating coil of the first heating element may be arranged on the top surface of the thermal insulation plate of the first heating element. The heating coil of the second heating element may be arranged on the bottom surface of the thermal insulation plate of the second heating element. The heating coil of the second heating element may be further arranged on the top surface of the thermal insulation plate of the second heating element. A warming tray may be disposed on top of the top portion of the housing. The first heating element may be located between the upper food-carrying run and the lower return run of the belt.

BRIEF DESCRIPTION OF THE DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the present invention. That is, the dimensions of the components of the present invention, independently and in relation to each other can be different. It should be noted that the drawings are schematic and not necessarily drawn to scale. Some drawings are enlarged or reduced to improve drawing legibility.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and is made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. When not explicitly defined herein, to the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "proximate" refers to positions that are situated close/near in relationship to a structure. As used in the following description, the term "distal" refers to positions that are situated away from positions.

The present disclosure includes many aspects and features. Moreover, while many aspects and features relate to, and are described in the context of food heating apparatuses, embodiments of the present disclosure are not limited to use only in this context.

The present invention is a food heating apparatus that is specifically designed to heat or reheat food, especially flat baked or cooked food, such as cookies, biscuits, etc. However, it should be noted that the present invention can also be utilized in the heating process of other food products, such as bread-type food products, including buns, rolls, croissants, bagels, muffins, and the like. It is an aim of the present invention to provide a food heating apparatus that allows users to customize the heating process, such as heating temperature, heating time, etc., for optimal taste and flavor. It is another aim of the present invention to provide a compact food heating apparatus that is simple in structure, inexpensive to manufacture, and easy to use.

Figure 1:
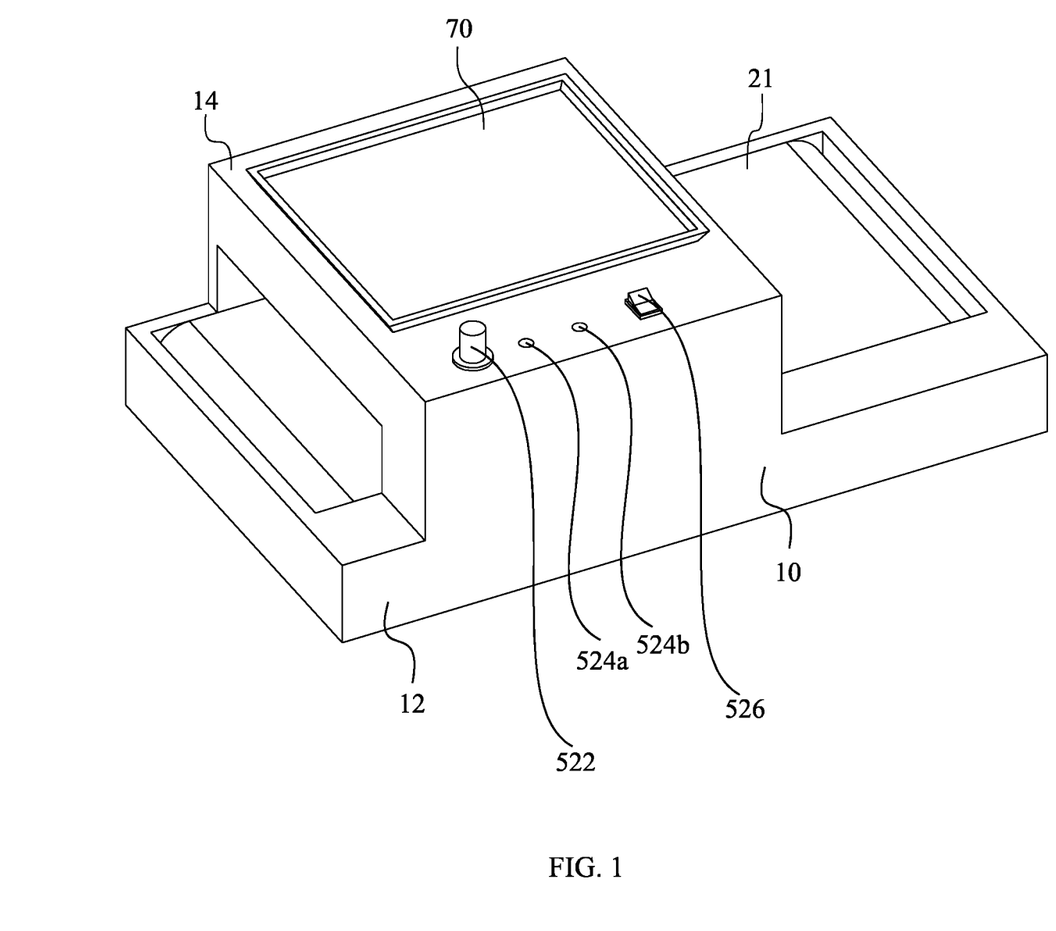
FIG. 1 depicts a perspective view of the present invention.

Referring now to the figures of the present disclosure. FIG. 1 is a perspective view illustrating the present invention. The food heating apparatus of the present invention comprises a housing 10, a conveyor assembly 20, a first heating element 30, a second heating element 40, and a control unit 50.

Figure 2:
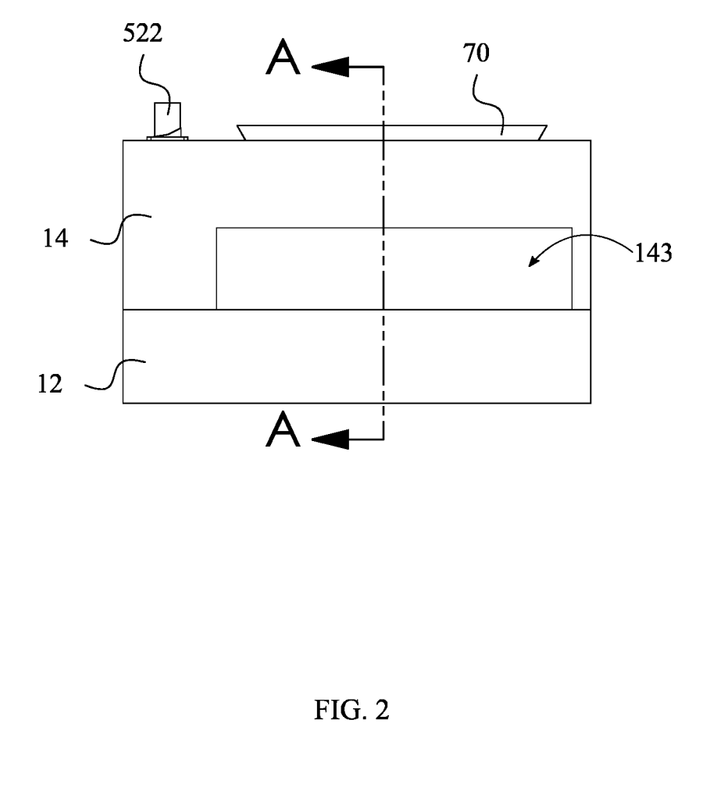
FIG. 2 depicts a perspective side view of the present invention.
Figure 3:
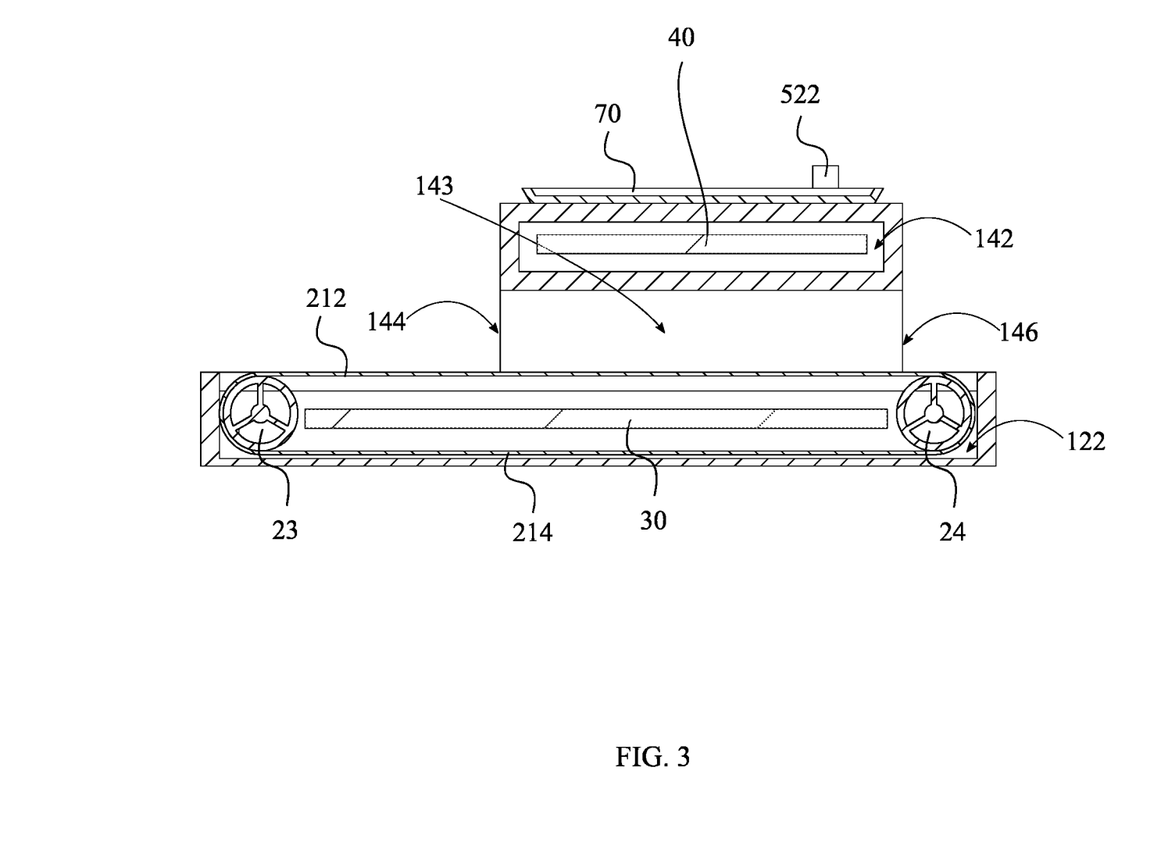
FIG. 3 depicts a cross-sectional view, taken along the line A-A in FIG. 2.

In reference to FIGS. 1-3, the housing 10 comprises a base portion 12 and a top portion 14. It should be noted that the housing 10 can be of any shape, size, material, features, type or kind, orientation, location, quantity, components, and arrangements of components that would allow the present invention to fulfill the objectives and intents of the present invention. The base portion 12 comprises a first interior space 122 for receiving the conveyor assembly 20 and the first heating element 30. The top portion 14 comprises a second interior space 142 for receiving the second heating element 40. Furthermore, a tunnel 143 is formed at the lower part of the top portion 14 such that the conveyor assembly 20 can move food products through the tunnel 143. The tunnel 143 has an entrance 144 and an exit 146. The conveyor assembly 20 is configured to move food items from the entrance 144 through the tunnel 143 to the exit 146. In a preferred embodiment, the top portion is further provided with a warming tray 70 on the top. In one embodiment, the housing 10 is formed in one piece. However, in other embodiments, the base portion 12 and the top portion 14 can be separate components that can couple to each other.

In reference to FIGS. 3-8, the conveyor assembly 20 is configured to move food items through the tunnel 143. The conveyor assembly 20 of the present invention comprises a belt 21, a motor 22, a driving pulley 23, a driven pulley 24, and a tensioning mechanism 25.

Figure 4:
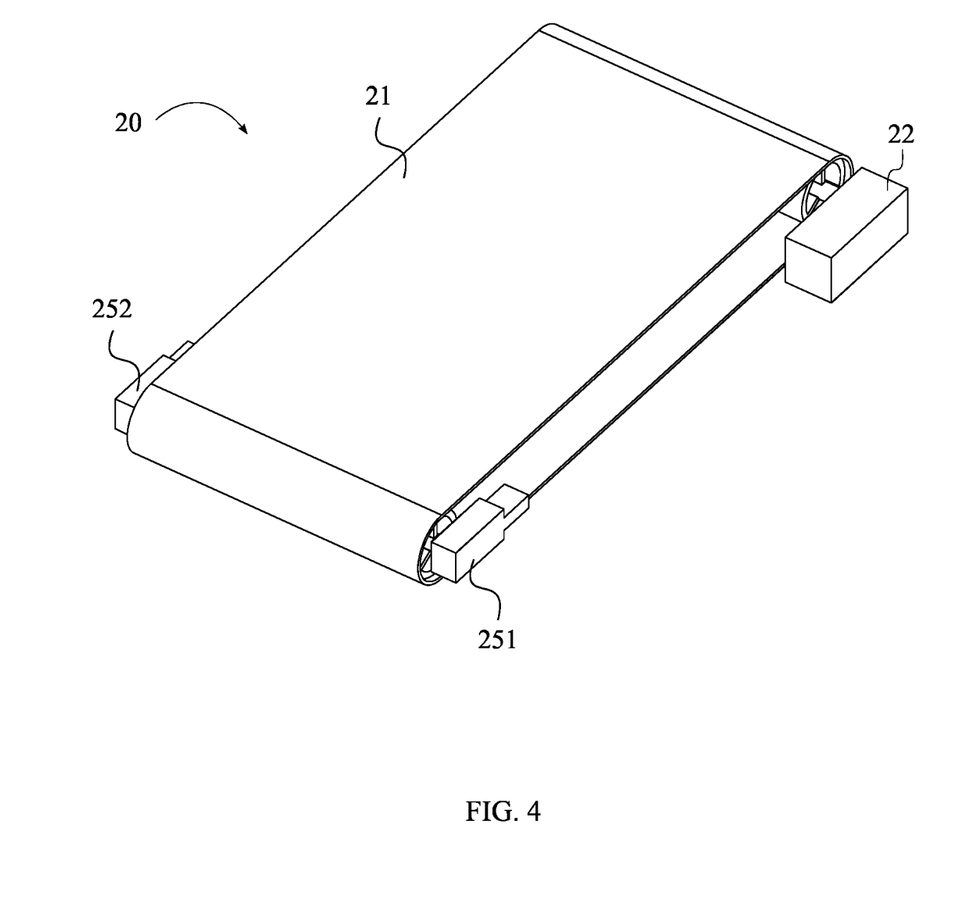
FIG. 4 depicts a perspective view of the conveyor assembly of the present invention.

The belt 21 can be an endless belt that is supported for rotation in a substantially vertical plane so as to define an upper food-carrying run 212 and a lower return run 214 that are arranged in parallel to each other. The upper food-carrying run 212 may be substantially horizontal to support the food items during transport through the tunnel 143. The belt 21 has a width generally corresponding to the width of the tunnel 143 and is designed to travel in a direction from the entrance 144 to the exit 146 of the tunnel 143, or alternatively in an opposite direction from the exit 146 to the entrance 144 of the tunnel 143. In a preferred embodiment, the base portion 12 is greater than the top portion 14 in length so that a food loading section for receiving unheated food items and a food unloading section for gathering heated food items once they have traveled through the tunnel 143 may be formed on the upper food-carrying upper run 212 of the belt 21. The belt 21 can be made from a material that is flexible, durable, easily-cleanable, non-stick, thermally-conductive, and/or easily manufacturable. In a preferred embodiment, the belt 21 is a fiberglass polytetrafluoroethylene ("PTFE") coated belt such that the belt is resistant to crease or tear and easy to clean. The food items are static relative to the belt 21 of the conveyor assembly 20, which is dynamic relative to, for example, the housing 10. It should be noted that it is extremely beneficial for the belt to be highly thermally-conductive such that a more efficient heating process may be achieved.

Figure 5:
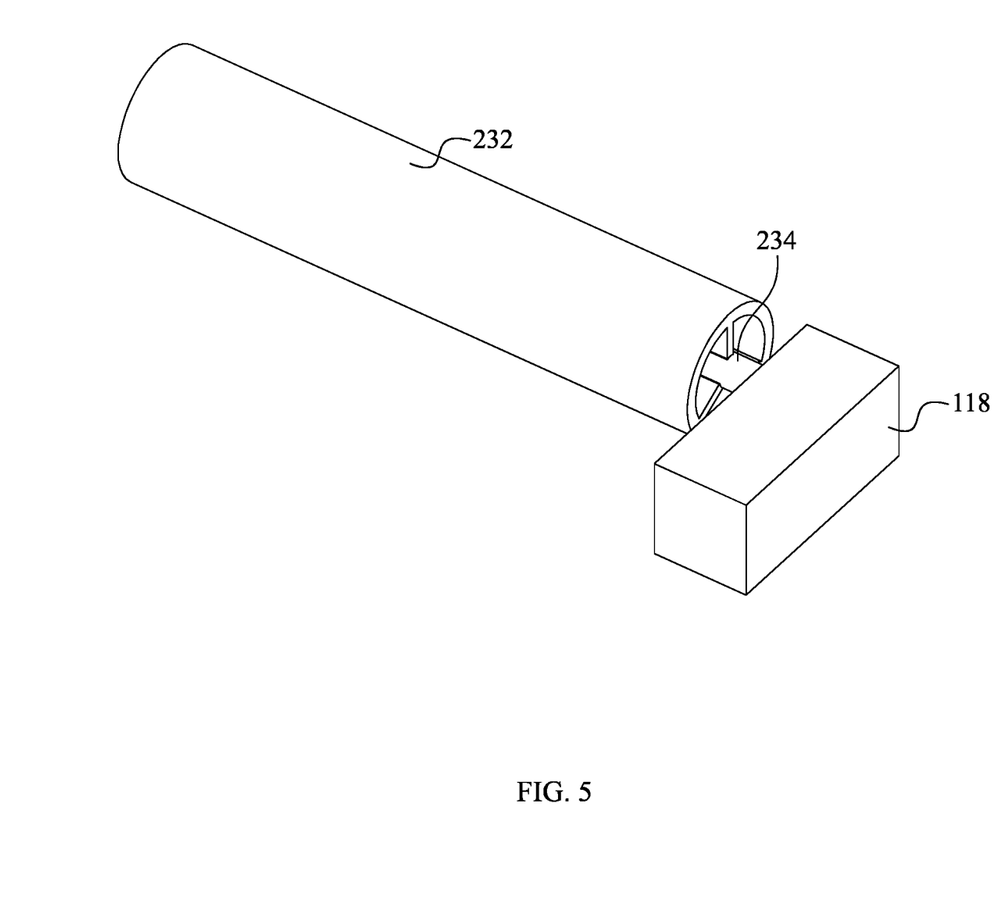
FIG. 5 depicts a perspective view of the driving pulley and the motor of the present invention.

The motor 22 is configured to rotate the driving pulley 23 and thus the belt 21 and the driven pulley 24. The motor 22 is electrically connected to the control unit 50 and is driven under the control of the control unit 50. The motor 22 can be suitably secured to the internal wall of the base portion 12. The motor 22 can be any type of motor that is adapted to drive the driving pulley 23. For example, the motor 22 comprises a direct current (DC) motor, a brushless DC motor, an alternating current (AC) motor. In a preferred embodiment, the motor 22 is a right angle worm drive motor. Furthermore, the speed and/or direction of the motor 22 can be controlled by the control unit 50, which is described in more detail hereinafter. In one embodiment, the motor 22 receives operating power from a power source 60. By way of example, the power source 60 can be local power source, such as a battery, or can be an external or grid power source. Moreover, the power source 60 provides any number of types and levels of voltage, such as alternating current (AC) or direct current (DC) power, or pulse width modulated (PWM) power from a PWM power source.

The driving pulley 23 comprises a first cylindrical body 232 providing a cylindrical outer surface and a driving pulley shaft 234. One end of the driving pulley shaft 234 is attached to the output shaft of the motor 22. In this way, the belt 21 is rotated together with the driven pulley 24 due to the rotation of the driving pulley 23 caused by the motor 22, and the food items on the belt 21 are conveyed in the desired direction.

Figure 6:
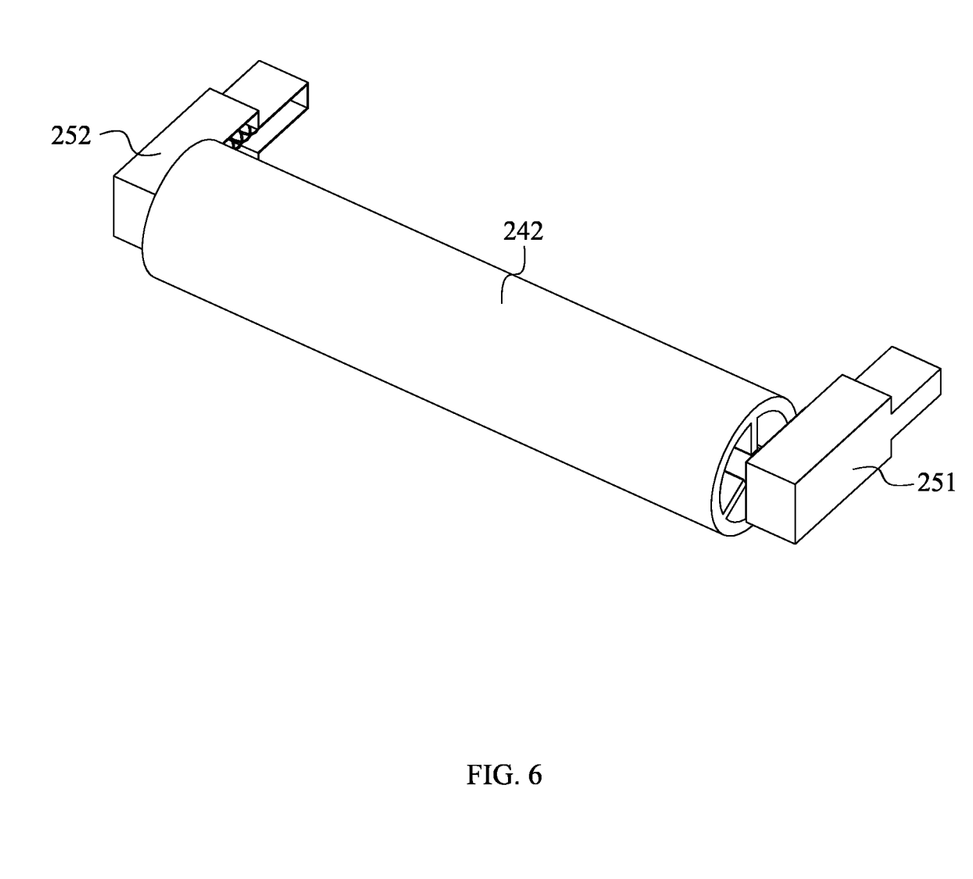
FIG. 6 depicts a perspective view of the driven pulley and the tensioning mechanism of the present invention.

Similar to the driving pulley 23, the driven pulley 24 comprises a second cylindrical body 242 providing a cylindrical outer surface and a driven pulley shaft 244. Preferably, the driving pulley 23 and the driven pulley 24 are arranged at two opposite ends in the first interior space 122 of the base portion 12 of the housing 10. The belt is routed around the driving pulley 23 and the driven pulley 24, engaging their respective cylindrical outer surfaces. Preferably, the first cylindrical body 232 of the driving pulley 23 and the second cylindrical body 242 of the driven pulley 24 are of the same or substantially the same diameter such that the upper food-carrying run 212 and the lower return run 214 of the belt 21 are parallel to each other.

Figure 7:
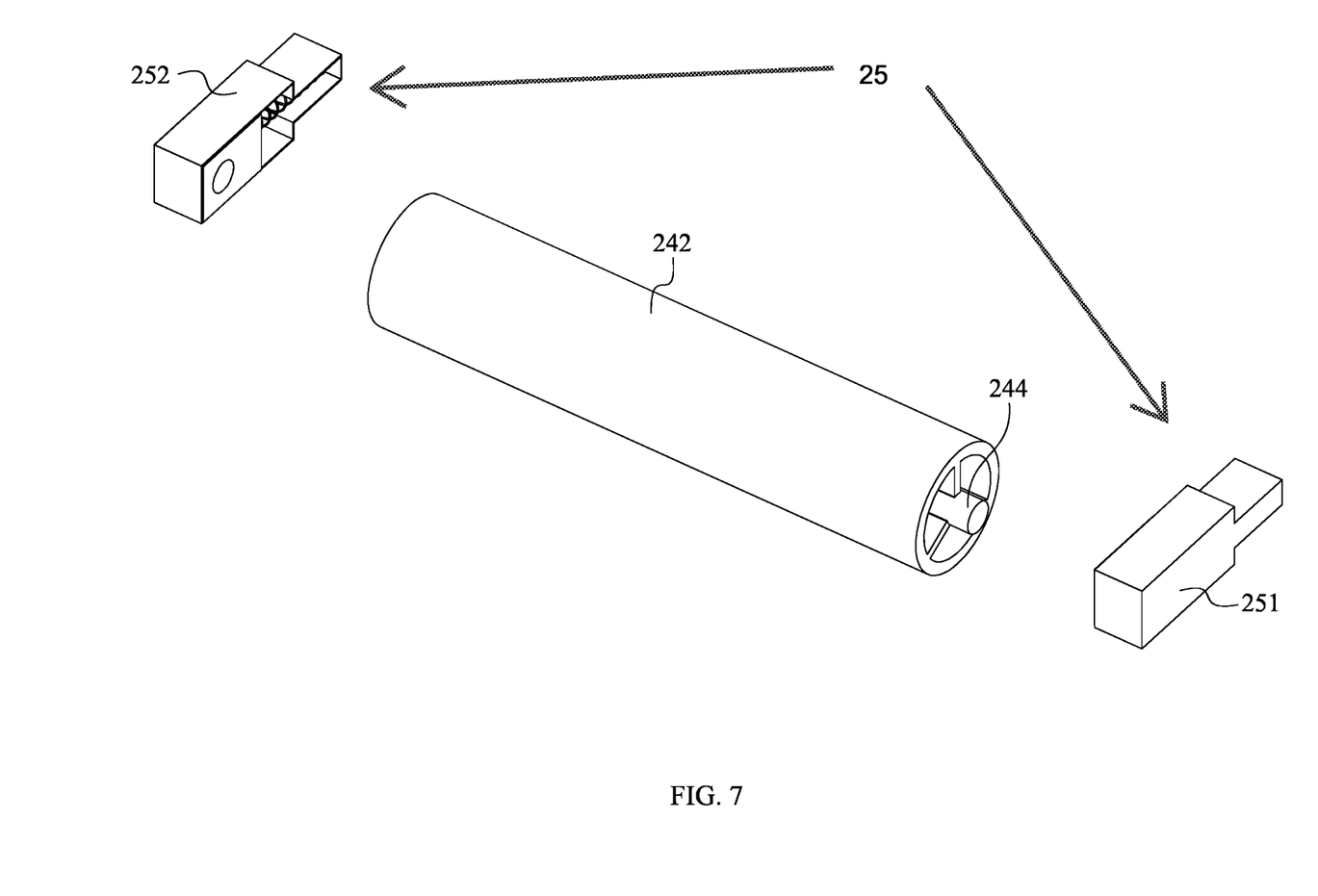
FIG. 7 depicts an exploded view of the driven pulley and the tensioning mechanism of the present invention.
Figure 8:
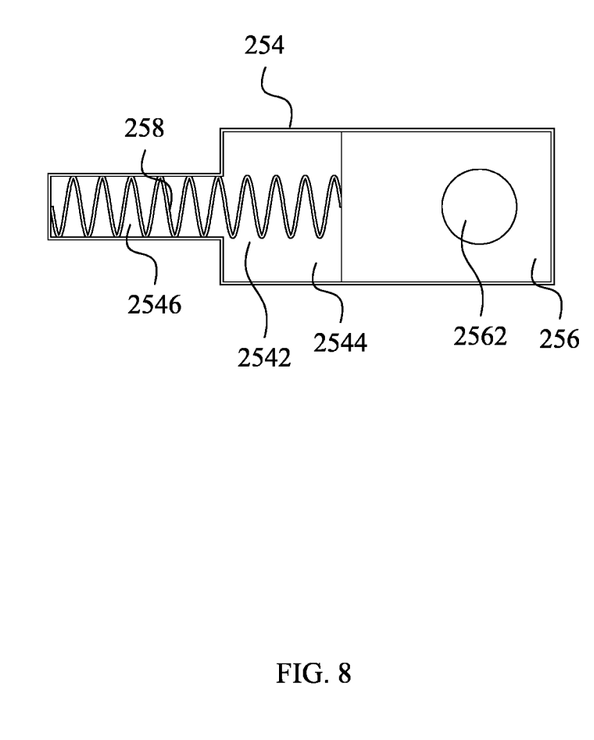
FIG. 8 depicts a front view of the tension assembly of the present invention.

The tensioning mechanism 25 is configured to provide tension on the belt 21. It should be noted that the tensioning mechanism 25 can be of any shape, size, material, features, type or kind, orientation, location, quantity, components, and arrangements of components that would allow the present invention to fulfill the objectives and intents of the present invention. In the illustrated embodiment, the tensioning mechanism comprise a pair of tensioning assemblies, i.e., a first tensioning assembly 251 and a second tensioning assembly 252 arranged on opposite ends of the driven pulley shaft 244. Each of the first tensioning assembly 251 and the second tensioning assembly 252 comprises a frame 254, a movable block 256, and a spring 258. The frame 254 comprises a groove or slot 2542 that comprises an expanded section 2544 and a reduced section 2546 for receiving the movable block 256 and the spring 258, respectively. Specifically, the movable block 256 is received in the expanded section 2544 such that the movable block 256 can perform linear movement in the expanded section 2544. The movable block 256 further comprises a hole 2562 for receiving the end of the driven pulley shaft 244. The spring 258 is, at one end, connected to the movable block 256, and, at its opposite end, engages an end wall of the reduced section 2546. In this way, the spring 258 is operative to cause the driven pulley shaft 244 to move away from the driving pulley Shaft 234 to maintain the belt 21 in tension. It should be noted that the frame 254 may be a component affixed to the internal wall of the base portion 12 or can be integrally formed on the internal wall of the base portion 12.

The first heating element 30 is disposed between the upper food-carrying run 212 and the lower return run 214 of the belt 21. In reference to a preferred embodiment illustrated in FIGS. 1-10, the first heating element 30 comprise a thermal insulation plate 32 and a heating coil 34. Preferably, the heating coil is made of nickel-chrome alloy. In one preferred embodiment, the heating coil 34 may only be arranged on the top surface of the thermal insulation plate 32.

Figure 9:
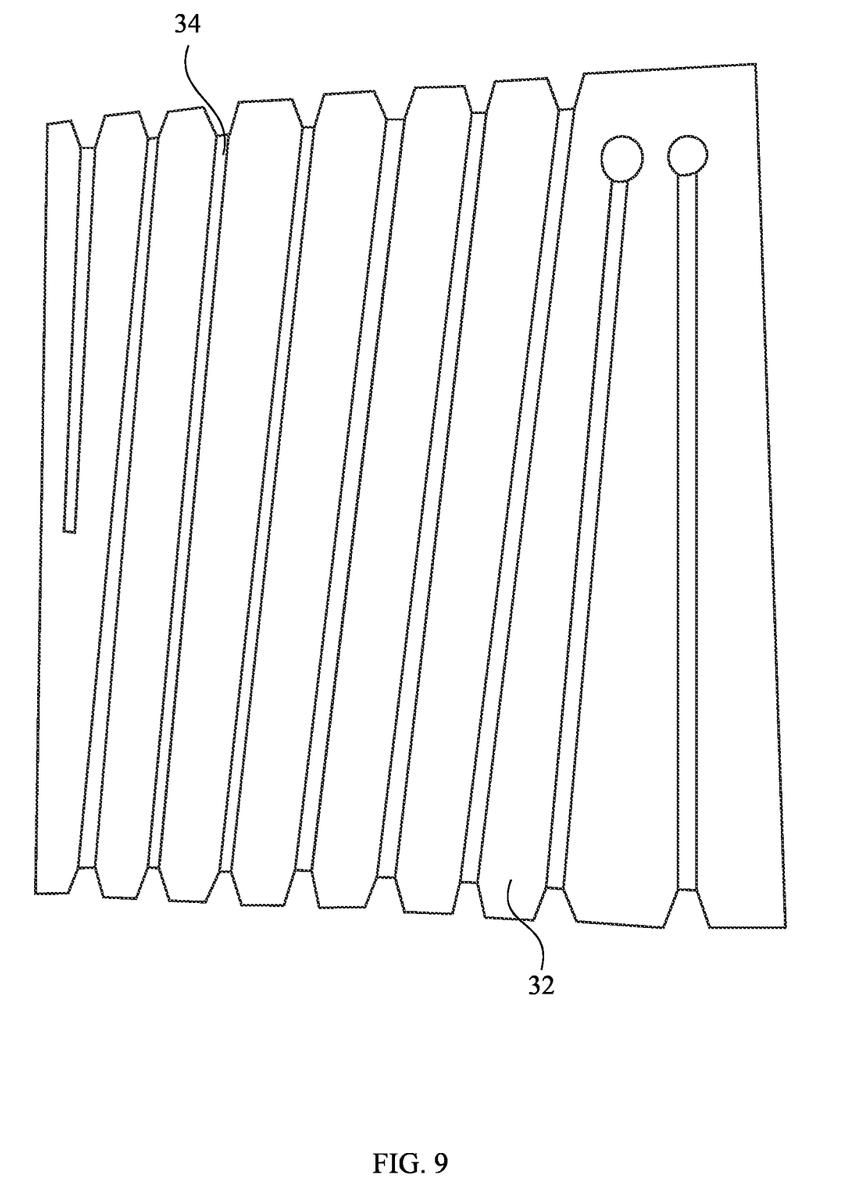
FIG. 9 depicts a perspective view of the heating element of the present invention.

The second heating element 40 may be similar to the first heating element 30 in structure. However, due to the reduced size of the top portion 14 of the housing 10, the second heating element may have smaller dimensions. Specifically, the second heating element may comprise a thermal insulation plate and a heating coil. The heating coil of the second heating element may be arranged on the bottom surface of the thermal insulation plate of the second heating element. In a preferred embodiment, the heating coil of the second heating element 40 can be arranged on both sides of the thermal insulation plate (i.e., top surface and bottom surface) such that the present invention can also keep the food items in the warming tray 70 in a desired temperature. It should be noted that each of the first heating element 30 and the second heating element 40 can be of any shape, size, material, features, type or kind, orientation, location, quantity, components, and arrangements of components that would allow the present invention to fulfill the objectives and intents of the present invention.

Figure 10:
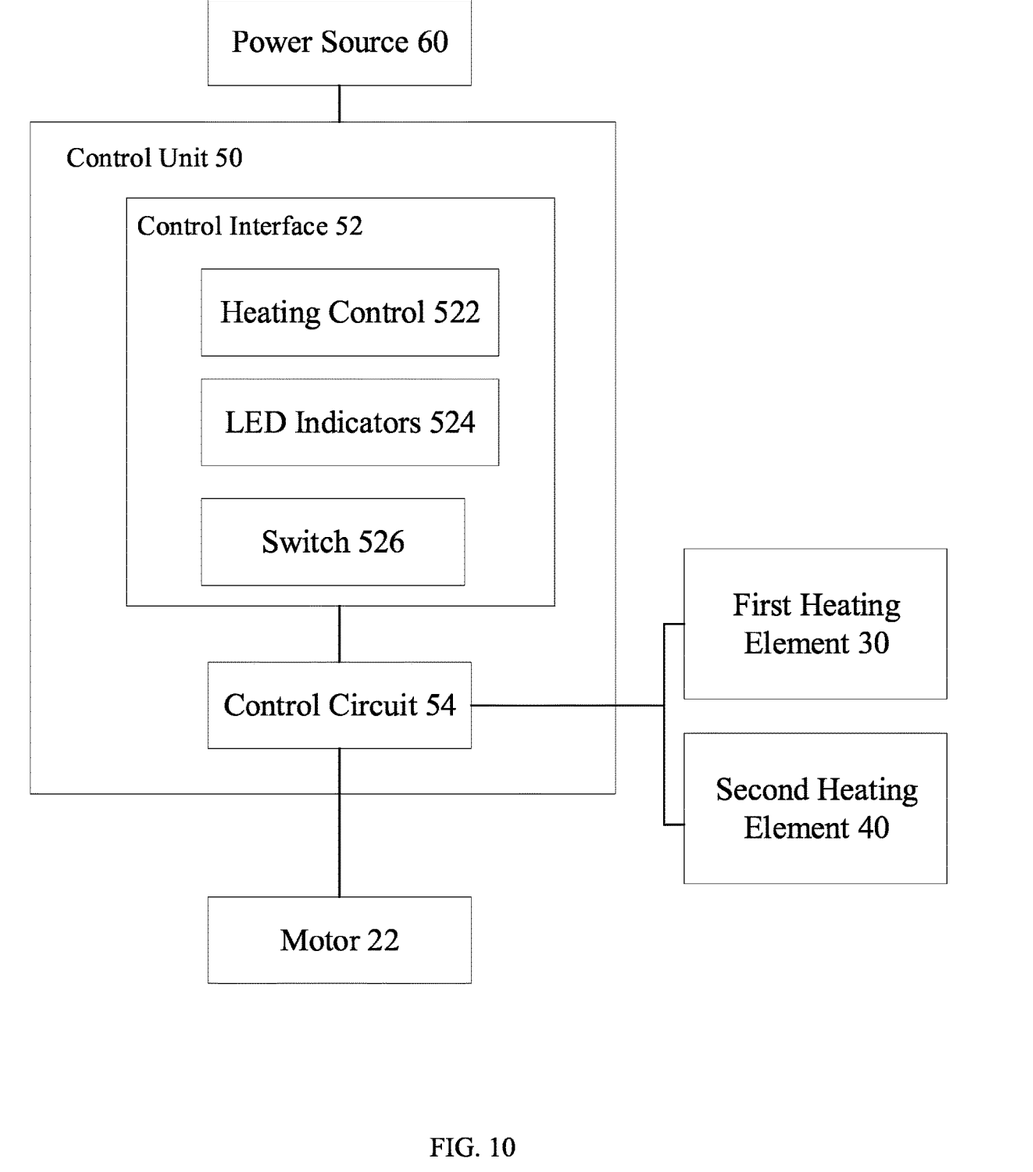
FIG. 10 depicts a block diagram illustrating the control unit of the present invention.

In reference to FIG. 10, the control unit 50 comprises a control interface 52 that can be integrally formed on the housing 10 and a control circuit 54. The control interface 52 may comprise a heating control 522, a plurality of LED indicators 524, and a switch 526. In the illustrated embodiment, the heating control 522 is presented in the form of a dial that can be rotated by the user in order to control the motor speed and/or the heating temperature. However, other types of control mechanisms are also contemplated. The control circuit 54 is configured to regulate the motor speed and/or the heating temperature by the input voltage, frequency, or any other suitable parameters. In the illustrated embodiment, the plurality of LED indicators 524 comprises two LED indicators, i.e., an LED indicator 524a and an LED indicator 524b. For example, the LED indicator 524a can be lit to indicate that the apparatus is turned on, while the LED indicator 524b can illuminate to indicate a hot upper food-carrying run 212 of the belt 21. The switch 526 is configured to turn on or turn off the electric power supplied from the power source.

It is envisioned that the sizes of the components forming the present invention such as the housing 10, the conveyor assembly 20, the first heating element 30, and/or the second heating element 40 can vary based on design requirements.

Although the disclosure has been explained in relation to its preferred embodiment, it is to be understood that many other possible modifications and variations can be made without departing from the spirit and scope of the disclosure.

What is claimed is:

1. A food heating apparatus comprising:
a housing;
a conveyor assembly;
a first heating element;
a second heating element;
a control unit;
a power source;
the housing comprising a base portion and a top portion;
the base portion forming a first interior space in which the conveyor assembly is located;
the top portion forming a second interior space in which the second heating element is located;
the top portion further forming a tunnel;
the tunnel comprising an entrance and an exit;
the conveyor assembly comprising a belt, a motor, a driving pulley, a driven pulley, and a tensioning mechanism;
the belt comprising an upper food-carrying run and a lower return run;
the driving pulley comprising a first cylindrical body and a driving pulley shaft;
the driven pulley comprising a second cylindrical body that is substantially of the same diameter as the first cylindrical body and a driven pulley shaft;
the motor being electrically connected to the power source and comprising an output shaft which is connected to the driving pulley shaft;
the tensioning mechanism comprising a first tensioning assembly and a second tensioning assembly;
the first tensioning assembly and the second tensioning assembly being arranged on opposite ends of the driven pulley shaft, respectively;
each of the first tensioning assembly and the second tensioning assembly comprising a frame, a movable block, and a spring;
the frame of each of the first tensioning assembly and the second tensioning assembly comprising a groove with an expanded section and a reduced section;
the movable block of each of the first tensioning assembly and the second tensioning assembly moving linearly in respective expanded section;
the movable block of each of the first tensioning assembly and the second tensioning assembly comprising a hole to receive an end of the driven pulley shaft, respectively;
the spring of each of the first tensioning assembly and the second tensioning assembly being, at one end, connected to respective movable block;
the spring of each of the first tensioning assembly and the second tensioning assembly being, at an opposite end, engaging an end wall of the reduced section; and
the control unit comprising a control circuit that is configured to control a speed of the motor.

2. The food heating apparatus as claimed in claim 1, wherein the belt comprises a fiberglass PTFE coated belt.

3. The food heating apparatus as claimed in claim 1, wherein the frame is integrally formed with the housing.

4. The food heating apparatus as claimed in claim 1, wherein the first heating element comprises a thermal insulation plate forming a top surface and a bottom surface and a heating coil, and the heating coil is arranged on the top surface of the thermal insulation plate.

5. The food heating apparatus as claimed in claim 1, wherein the second heating element comprises a thermal insulation plate forming a top surface and a bottom surface and a heating coil, and the heating coil is arranged on the bottom surface of the thermal insulation plate.

6. The food heating apparatus as claimed in claim 5, wherein the heating coil is further arranged on the top surface of the thermal insulation plate, and the food heating apparatus further comprises a warming tray disposed on top of the top portion of the housing.

7. The food heating apparatus as claimed in claim 1, wherein the first heating element is located between the upper food-carrying run and the lower return run.

8. A food heating apparatus comprising:
a housing;
a conveyor assembly;
a first heating element;
a second heating element;
a control unit;
a power source;
the housing comprising a base portion and a top portion;
the base portion forming a first interior space in which the conveyor assembly is located;
the top portion forming a second interior space in which the second heating element is located;
the top portion further forming a tunnel;
the tunnel comprising an entrance and an exit;
the conveyor assembly comprising a belt, a motor, a driving pulley, a driven pulley, and a tensioning mechanism;
the belt comprising an upper food-carrying run and a lower return run;
the driving pulley comprising a first cylindrical body and a driving pulley shaft;
the driven pulley comprising a second cylindrical body that is substantially of the same diameter as the first cylindrical body and a driven pulley shaft;
the motor being electrically connected to the power source and comprising an output shaft which is connected to the driving pulley shaft;
the tensioning mechanism comprising a first tensioning assembly and a second tensioning assembly;
the first tensioning assembly and the second tensioning assembly being arranged on opposite ends of the driven pulley shaft, respectively;
each of the first tensioning assembly and the second tensioning assembly comprising a frame, a movable block, and a spring;
the frame of each of the first tensioning assembly and the second tensioning assembly comprising a groove with an expanded section and a reduced section;
the movable block of each of the first tensioning assembly and the second tensioning assembly moving linearly in respective expanded section;
the movable block of each of the first tensioning assembly and the second tensioning assembly comprising a hole to receive an end of the driven pulley shaft, respectively;
the spring of each of the first tensioning assembly and the second tensioning assembly being, at one end, connected to respective movable block;
the spring of each of the first tensioning assembly and the second tensioning assembly being, at an opposite end, engaging an end wall of the reduced section;
the control unit comprising a control interface and a control circuit;
the control interface comprising a heating control that is configured to receive a user's selection of a speed of the motor;
the control circuit being configured to regulate the speed of the motor based on the user's selection.

9. The food heating apparatus as claimed in claim 8, wherein the belt comprises a fiberglass PTFE coated belt.

10. The food heating apparatus as claimed in claim 8, wherein the frame is integrally formed with the housing.

11. The food heating apparatus as claimed in claim 8, wherein the first heating element comprises a thermal insulation plate forming a top surface and a bottom surface and a heating coil, and the heating coil is arranged on the top surface of the thermal insulation plate.

12. The food heating apparatus as claimed in claim 8, wherein the second heating element comprises a thermal insulation plate forming a top surface and a bottom surface and a heating coil, and the heating coil is arranged on the bottom surface of the thermal insulation plate.

13. The food heating apparatus as claimed in claim 12, wherein the heating coil is further arranged on the top surface of the thermal insulation plate, and the food heating apparatus further comprises a warming tray disposed on top of the top portion of the housing.

14. The food heating apparatus as claimed in claim 8, wherein the first heating element is located between the upper food-carrying run and the lower return run.

* * * * *